(12) United States Patent
Hino et al.

(10) Patent No.: US 10,010,865 B2
(45) Date of Patent: Jul. 3, 2018

(54) SANITARY WARE HAVING PHOTOCATALYST LAYER

(71) Applicant: TOTO LTD., Kitakyushu-shi, Fukuoka (JP)

(72) Inventors: Takahiro Hino, Fukuoka-ken (JP); Tomoyasu Ichiki, Fukuoka-ken (JP); Shinichi Yagi, Fukuoka-ken (JP); Satoshi Takano, Fukuoka-ken (JP); Mitoki Higashi, Fukuoka-ken (JP)

(73) Assignee: Toto Ltd., Fukuoka (JP)

( * ) Notice: Subject to any disclaimer, the term of this patent is extended or adjusted under 35 U.S.C. 154(b) by 26 days.

(21) Appl. No.: 15/263,902

(22) Filed: Sep. 13, 2016

(65) Prior Publication Data

US 2017/0072384 A1  Mar. 16, 2017

(30) Foreign Application Priority Data

Sep. 15, 2015 (JP) .................. 2015-182034
Jul. 5, 2016 (JP) .................. 2016-133044

(51) Int. Cl.
| | |
|---|---|
| *B01J 21/06* | (2006.01) |
| *B01J 21/08* | (2006.01) |
| *B01J 35/00* | (2006.01) |
| *B01J 37/02* | (2006.01) |
| *B01J 37/08* | (2006.01) |
| *C04B 41/00* | (2006.01) |
| *C04B 41/50* | (2006.01) |
| *C04B 41/52* | (2006.01) |
| *C04B 41/89* | (2006.01) |
| *C09D 1/00* | (2006.01) |
| *C09D 5/14* | (2006.01) |
| *C04B 111/20* | (2006.01) |

(52) U.S. Cl.
CPC ............ *B01J 21/066* (2013.01); *B01J 21/08* (2013.01); *B01J 35/004* (2013.01); *B01J 35/0006* (2013.01); *B01J 37/0244* (2013.01); *B01J 37/086* (2013.01); *C04B 41/009* (2013.01); *C04B 41/5024* (2013.01); *C04B 41/5072* (2013.01); *C04B 41/52* (2013.01); *C04B 41/522* (2013.01); *C04B 41/89* (2013.01); *C09D 1/00* (2013.01); *C09D 5/14* (2013.01); *C04B 2111/2061* (2013.01)

(58) Field of Classification Search
CPC ........ B01J 21/063; B01J 21/066; B01J 21/08; B01J 35/0006; B01J 35/004; B01J 37/0244; B01J 37/086; C04B 41/009; C04B 41/5024; C04B 41/5072; C04B 41/52; C04B 41/522; C04B 41/89
See application file for complete search history.

(56) References Cited

U.S. PATENT DOCUMENTS

| | | | |
|---|---|---|---|
| 6,071,623 A | 6/2000 | Sugawara et al. | |
| 7,612,015 B2 * | 11/2009 | Anzaki | A01N 59/16 427/162 |
| 7,977,270 B2 * | 7/2011 | Kitazaki | B01J 35/004 502/159 |
| 9,079,155 B2 * | 7/2015 | Fujii | B01J 21/063 |
| 9,662,645 B2 * | 5/2017 | Takano | C04B 41/009 |
| 2006/0020052 A1 * | 1/2006 | Tsujimoto | B01J 35/004 522/71 |
| 2008/0188370 A1 * | 8/2008 | Vormberg | B01J 21/063 502/242 |
| 2011/0082027 A1 * | 4/2011 | Kitazaki | B01J 21/063 502/159 |
| 2011/0136660 A1 * | 6/2011 | Terasaki | B01J 21/06 502/159 |
| 2011/0143914 A1 * | 6/2011 | Kitazaki | B01J 21/063 502/1 |
| 2011/0236284 A1 * | 9/2011 | Hayakawa | B01J 35/004 423/239.1 |
| 2013/0153483 A1 * | 6/2013 | Morazzoni | B01J 19/123 210/263 |
| 2014/0017425 A1 | 1/2014 | Yagi et al. | |
| 2016/0023958 A1 * | 1/2016 | Yagi | B01J 21/063 427/372.2 |
| 2016/0129432 A1 * | 5/2016 | Ozaki | B01J 23/30 423/245.1 |

FOREIGN PATENT DOCUMENTS

| | | |
|---|---|---|
| JP | H11-278969 A | 10/1999 |
| KR | 1020050109003 A | 11/2005 |

* cited by examiner

*Primary Examiner* — Cam N. Nguyen
(74) *Attorney, Agent, or Firm* — Carrier Blackman & Associates, P.C.; Joseph P. Carrier; Anne G. Sabourin

(57) ABSTRACT

Disclosed is a sanitary ware having a photocatalyst layer which has excellent durability even in an environment where the photocatalyst layer is exposed to an acid and an alkali alternately. The sanitary ware comprises a glaze layer, an intermediate layer provided on the glaze layer, and a photocatalyst layer provided on the intermediate layer, wherein the photocatalyst layer comprises titanium oxide in the amount of 95 mass % to 75 mass % and zirconium oxide in the amount of 5 mass % to 25 mass % and the intermediate layer comprises silica in the amount of 98 mass % to 85 mass %, and titanium oxide and/or zirconium oxide in the amount of 2 mass % to 15 mass %.

9 Claims, No Drawings

SANITARY WARE HAVING PHOTOCATALYST LAYER

BACKGROUND OF THE INVENTION

Technical Field

The present invention relates to sanitary ware having a photocatalyst layer, which has excellent durability. More specifically, the present invention relates to sanitary ware having a photocatalyst layer, which has durability even against repeated washing under different pH conditions such as acid and alkali.

Background Art

A functional member, which has a photocatalyst layer provided on a glaze layer surface of a substrate having a glaze layer and which applies decomposition activity or hydrophilic activity of the photocatalyst, is being used in various applications. For example, a sanitary ware having a photocatalytic surface layer formed on its surface is known. Such a sanitary ware can suppress sticking of filth thereto by virtue of hydrophilicity exhibited by irradiation of light, preferably ultraviolet light, on the photocatalyst layer and, at the same time, can suppress proliferation of bacteria by virtue of decomposition action by the photocatalyst. This leads to reduction of a load of cleaning the sanitary ware.

As such a photocatalyst layer provided on the glaze layer surface, a layer comprising titanium oxide and a zirconia compound has been proposed as having good film strength, water resistance, or abrasion resistance while maintaining good photocatalytic activity (JP 2012-206907A and JP 2014-69098A).

Although a load of cleaning is reduced by the presence of the photocatalyst layer, the sanitary ware is periodically cleaned and, at which time, it is common to use a detergent having an acidic or alkaline pH. Furthermore, the sanitary ware is wiped with a brush and the like in order to remove stains, and thus physical stress is applied to the sanitary ware. The photocatalyst layer is required to have performance to endure such a load during cleaning for a long period of time, and especially performance not to lose activity of the photocatalyst and not to peel off.

On the other hand, in order to form a strong photocatalyst film, firing at a thigh temperature of 500 to 1000° C. is usually necessary. However, it is known that under such a high temperature, alkali ions in the glaze of the sanitary ware disperse and thereby deteriorate the photocatalytic activity. As a measure against this, it is known to provide an intermediate layer, which contains silica and the like as a main component and suppresses dispersion of the alkali ions, between the substrate and the photocatalyst layer (for example, JP H10-235201A, JP H11-228865A, JP 2001-152051A, and JP 2003-277056A).

These intermediate layers are, however, mainly aimed at preventing dispersion of alkalis, and according to experiments conducted by the present inventors, durability of the photocatalyst layer containing titanium oxide and a zirconia compound was inferior compared to the present invention.

SUMMARY OF THE INVENTION

In evaluation of durability of the photocatalyst layer, it has generally been performed to test the photocatalyst layer after exposure to an acidic liquid alone or exposure to an alkaline liquid alone. And, when the photocatalyst layer maintained good photocatalytic activity or was hard to peel off even after being exposed to an acidic or alkaline pH alone the photocatalyst layer was evaluated as having good durability.

However, according to knowledge the present inventors obtained, there was a case in a real use environment where, for example, cleaning of the sanitary ware is performed by a washing liquid having an acidic pH and thereafter cleaning with a washing liquid having an alkaline pH is performed. In such a case, durability of the hitherto proposed photocatalyst layer was sometimes not sufficient.

The present inventors have found that, when providing a photocatalyst layer comprising titanium oxide and zirconium oxide on a glaze layer, durability of the photocatalyst layer can be greatly improved by providing a layer containing silica as a main component and titanium oxide and/or zirconium oxide in a specific ratio between the photocatalyst layer and the glaze layer. In particular, the present inventors have now found that such a photocatalyst layer shows excellent durability even in a situation that cleaning, where the photocatalyst layer is exposed to an acid and an alkali alternately, is repeated. The present invention is based on such knowledge.

Accordingly, the object of the present invention is to provide a sanitary ware having a photocatalyst layer which has excellent durability, especially, to provide a sanitary ware having a photocatalyst layer which has excellent durability even in an environment where the photocatalyst layer is exposed to an acid and an alkali alternately.

The sanitary ware according to the present invention is a sanitary ware having a glaze layer, an intermediate layer provided on the glaze layer, and a photocatalyst layer provided on the intermediate layer, wherein the photocatalyst layer comprises titanium oxide and zirconium oxide wherein the amount of titanium oxide is 95 mass % to 75 mass % and the amount of zirconium oxide is 5 mass % to 25 mass % and the intermediate layer comprises silica and titanium oxide and/or zirconium oxide wherein the amount of silica is 98 mass % to 85 mass %, and the amount of titanium oxide or zirconium oxide is 2 mass % to 15 mass % when the intermediate layer comprises either of titanium oxide or zirconium oxide or the total amount of titanium oxide and zirconium oxide is 2 mass % to 15 mass % when the intermediate layer comprises both titanium oxide and zirconium oxide.

DETAILED DESCRIPTION OF THE INVENTION

Definition

In the present invention, a "sanitary ware" means a sanitary ware used around toilets and washrooms, and specifically means a closet bowl, a urinal, a strainer for a urinal, a toilet bowl tank, a wash basin of a washstand, and a hand washer. Further, "ware" means, among ceramic wares, one which has been densified to such an extent that the body has slight water absorption, and has a glaze applied on its surface.

In the present invention, "durability" of the photocatalyst layer is used as a term which represents individually or generally that the photocatalyst layer does not peel off easily and that temporal deterioration of photocatalytic activity is scarce, but, in particular, it is used as a term which represents individually or generally that, when exposed to acidic and alkaline pH alternately, the photocatalyst layer does not peel off easily and temporal deterioration of photocatalytic activity is scarce.

Acidity means from weak acidity to strong acidity, and specifically means a pH being in a range of 5 or less, and alkalinity means from weak alkalinity to strong alkalinity, and specifically means a pH being in a range of 8 or more.

Sanitary Ware According to the Present Invention

The sanitary ware according to the present invention has a basic structure comprising a substrate, a glaze layer on a surface thereof, an intermediate layer provided on the glaze layer, and a photocatalyst layer provided on the intermediate layer. And the intermediate layer and the photocatalyst layer are composed of specific compositions as described below.

The sanitary ware according to the present invention is excellent in durability of the photocatalyst layer, In particular, the photocatalyst layer exhibits excellent durability even when placed in such an environment that it is exposed to acidity and alkalinity alternately. As described above, in evaluation of durability of the photocatalyst layer, it has generally been performed to test the photocatalyst layer after exposure to an acidic liquid alone or after exposure to an alkaline liquid alone. However, it was observed that even a conventional photocatalyst layer, which exhibited sufficient durability in evaluation with an acid or an alkali alone, showed peeling of the photocatalyst layer or deterioration of the photocatalytic activity in an unexpectedly short time when placed in an environment where the photocatalyst layer is exposed to acidity and alkalinity alternately. In the present invention, there is provided a sanitary ware having a photocatalyst layer which shows improved durability even when placed in such an environment where the photocatalyst layer is exposed to acidity and alkalinity alternately.

Even though the present inventors do not wish to be bound by a specific theory, the reason why the sanitary ware according to the present invention is excellent in durability of the photocatalyst layer is as follows. The photocatalyst layer comprising titanium oxide and zirconium oxide has a very low water permeability, and this sometimes allows water to reach the glaze layer surface of the sanitary ware. When the pH of the water changes alternately between acidity and alkalinity, the following reactions are accelerated. First, by acidic water, metal elements in the glaze such as potassium, calcium, magnesium, zinc, and the like are eluted, and when alkaline water reaches this eluted portion, it cleaves Si—Si bonds in the vicinity. By repetition of these reactions, binding between the glaze layer and the photocatalyst layer becomes weak and, in the worst case, the photocatalyst layer peels off. In the present invention, the intermediate layer is thought to make the glaze surface and the photocatalyst layer bind to each other strongly while inhibiting infiltration of this slight amount of water. The above explanation is only an assumption, and the present invention is not limited by this.

Photocatalyst Layer

The photocatalyst layer of the sanitary ware according to the present invention comprises titanium oxide and zirconium oxide in amounts of 95 mass % to 75 mass % and 5 to 25 mass %, respectively. As for the content of titanium oxide, its preferable lower limit is 80 mass % and its preferable upper limit is 90 mass %. And as for the content of zirconium oxide, its preferable lower limit is 10 mass % and its preferable upper limit is 20 mass %.

In the present invention, titanium oxide is not particularly limited as long as it has photocatalytic activity, and may be either of anatase type and rutile type, with the anatase type being preferable.

In the present invention, a film thickness of the photocatalyst layer may be determined suitably in consideration of required photocatalytic activity and other various characteristics, but is preferably about 50 nm to 150 nm, with more preferable upper limit being 120 nm.

Intermediate Layer

In the sanitary ware according to the present invention, the intermediate layer is provided between the glaze layer of the sanitary ware and the photocatalyst layer, and comprises silica, and titanium oxide and/or zirconium oxide. A content of the silica is in a range of 98 mass % to 85 mass %, and its preferable upper limit is 95 mass % and its preferable lower limit is 90 mass %. Furthermore, the content of titanium oxide or zirconium oxide is in a range of 2 mass % to 15 mass % when he intermediate layer comprises either of titanium oxide or zirconium oxide and contents of the titanium oxide and the zirconium oxide are, as a total of these when the intermediate layer comprises both, in a range of 2 mass % to 15 mass %, and its preferable upper limit is 10 mass % and its preferable lower limit is 5 mass %.

In the present invention, a film thickness of the intermediate layer may be suitably determined in a range such that durability of the photocatalyst layer is increased, but is preferably about 50 nm to 150 nm, with more preferable upper limit being 120 nm.

Sanitary Ware

Sanitary Ware Body

The earthenware body of the sanitary ware according to the present invention is not particularly limited and may be a usual sanitary ware body. Further, below the outermost photocatalyst layer having the aforementioned surface properties, there may be provided a glaze layer which becomes an interlayer.

Production Method

The sanitary ware according to the present invention can preferably be produced by the following method. That is, first, an earthenware body is obtained by molding a slurry for the sanitary ware body in a suitable shape by using cast molding utilizing a water-absorbing mold, the slurry being prepared by using silica sand, feldspar, clay, and the like as raw materials. Thereafter, the above-described glaze raw material is coated on a dried surface of the molded article by suitably selecting a common method such as spray coating, dip coating, spin coating, roll coating, and the like. The obtained molded article having a precursor layer of the surface glaze layer is then fired. The firing temperature is preferably a temperature of 1,000° C. or more and 1,300° C. or less, where the earthenware body is sintered and the glaze is softened.

Glaze

A glaze which forms the glaze layer of the sanitary ware according to the present invention is not limited in its composition as long as the above-described surface properties can be realized. In the present invention, a glaze raw material is generally defined as a mixture of natural mineral particles such as silica sand, feldspar, lime stone, and the like. Furthermore, a pigment refers to, for example, a cobalt compound, an iron compound, and the like, and an opalizer refers to, for example, zirconium silicate, tin oxide, and the like. An amorphous glaze refers to a glaze prepared by melting a glaze raw material comprising a mixture of the above-described natural mineral particles and the like at high temperature, and thereafter vitrifying the same by quenching. For example, a frit glaze can be used suitably.

According to a preferable embodiment of the present invention, a preferable glaze composition comprises, for example, 10 wt % to 30 wt % of feldspar, 15 wt % to 40 wt % of silica sand, 10 wt % to 25 wt % of calcium carbonate, less than 10 wt % each of corundum, talc, dolomite, and zinc oxide, and a total of 15 wt % or less of opalizer and pigment.

Method for Producing Sanitary Ware According to the Present Invention

The sanitary ware according to the present invention is produced by forming an intermediate layer and a photocatalyst layer on a glaze layer of a sanitary ware. The intermediate layer and the photocatalyst layer are formed in principle by firing silica, and titanium oxide and/or zirconium oxide, or precursors of these on the glaze layer, and by firing titanium oxide and zirconium oxide, or precursors of these on the intermediate layer. Here, firing for forming the intermediate layer and the photocatalyst layer may be performed each time after coating respective layers or these layers may be formed by firing at the same time. According to a preferable embodiment of the present invention, the intermediate layer and the photocatalyst layer are prepared as coating liquids comprising the above-described components, and are formed by coating and thereafter firing them.

According to one embodiment of the present invention, the photocatalyst layer can be produced by applying, preferably coating, a coating liquid comprising titanium oxide and zirconium oxide, or comprising precursors of these, and thereafter firing the coating liquid. According to a preferable embodiment of the present invention, there is used a coating liquid comprising a titanium alkoxide and a zirconium alkoxide as precursors of titanium oxide and zirconium oxide, respectively, and a photocatalyst layer is obtained by firing this.

In the present invention, as a precursor of titanium oxide, there can suitably be used titanium alkoxides and titanium chelates. The titanium alkoxides are basically represented by a general formula, $Ti(OR)_4$, and are not limited as long as they produce photocatalytic titanium oxide by hydrolysis. A part of the (OR) in the formula may be substituted with acetylacetonate ($C_5H_7O_2$) and ethyl acetoacetate ($C_6H_9O_3$). According to a preferable embodiment of the present invention, the titanium alkoxide is one having a lower (preferably $C_{1-6}$) alkyl group as an organic group R portion of the alkoxide (RO—). As preferable specific examples thereof, there may be mentioned tetraethoxytitanium, tetraisopropoxytitanium, tetra-n-propoxytitanium, tetrabutoxytitanium, tetramethoxytitanium, titanium diisopropoxy bis(acetylacetonate), titanium diisopropoxy bis(ethyl acetoacetate), and mixtures of these. Further, as the titanium chelate, there may be mentioned, for example, titanium tetraacetylacetonate.

Further, as the precursor of ziconium oxide, there can be suitably used zirconium alkoxides and zirconium chelates. The zirconium alkoxides are basically represented by a general formula, $Zr(OR)_4$, and are not particularly limited as long as they produce zirconium oxide by hydrolysis. A part of the (OR) in the formula may be substituted with acetylacetonate ($C_5H_7O_2$) and ethyl acetoacetate ($C_6H_9O_3$). According to a preferable embodiment of the present invention, the zirconium alkoxide is one having a lower (preferably $C_{2-6}$) alkyl group as an organic group R portion of the alkoxide (RO—). As preferable specific examples thereof, there may be mentioned zirconium tetraethoxide, zirconium tetraisopropoxide, zirconium tetrabutoxide, zirconium tributoxy monoacetylacetonate, zirconium dibutoxy bis(ethyl acetoacetate), zirconium monobutoxy acetylacetonate bis (ethyl acetoacetate), and mixtures of these. Further, as the zirconium chelate, there may be mentioned, for example, zirconium tetraacetylacetonate.

In the present invention, the intermediate layer can be produced by applying, preferably coating, a coating liquid comprising silica, and titanium oxide and/or zirconium oxide, or precursors of these, and thereafter firing the coating liquid. According to a preferable embodiment of the present invention, as a precursor of silica, there may be mentioned alkyl silicates such as methyl silicate, ethyl silicate, and the like, and polymers of these. Furthermore, as precursors of titanium oxide and zirconium oxide, there may preferably be used those exemplified for the photocatalyst.

Furthermore, as a solvent of the coating liquid, there may be mentioned alcohols such as ethanol, isopropanol, normal butanol, and the like; cellosolves such as methyl cellosolve, butyl cellosolve, and the like; aromatic hydrocarbons such as toluene, xylene, and the like; and esters such as ethyl acetate, butyl acetate, and the like, but the solvent is not particularly limited as long as it is a solvent in which the titanium alkoxides and the zirconium alkoxides are soluble.

To the coating liquid, there may be added, in addition to the above components, surfactants such as, for example, a levelling agent for improving uniformity of a coating layer.

Application of the coating liquid to the sanitary ware may preferably be carried out by a commonly widely performed method such as brush coating, roller, spray, roll coater, flow coater, dip coat, flow coating, screen printing, and the like.

The sanitary ware, to which the coating liquids for forming the intermediate layer and the photocatalyst layer are applied, is subjected to a firing step. Firing can be carried out first for the intermediate layer and thereafter for the photocatalyst layer, but according to a preferable embodiment of the present invention, they are calcined at the same time. Conditions for firing may be determined suitably but, for example, firing may be sufficient if carried out at a temperature of 700 to 900° C. for about 5 hours, preferably at a temperature of 750 to 850° C. for about 0.5 to 3 hours.

As is clear from the foregoing, according to a preferable embodiment of the present invention, there is provided a method for producing the sanitary ware of the present invention. The method comprises steps of: coating a coating liquid on a glaze layer of a sanitary ware, the coating liquid being obtained by mixing a silicon alkoxide or a hydrolysis product thereof, and a titanium alkoxide and/or a zirconium alkoxide; further coating a coating liquid containing the precursor of titanium oxide and the precursor of zirconium oxide; and thereafter firing the coating liquids at a temperature of 750 to 850° C.

EXAMPLES

The present invention will be described specifically based on the following examples, but the present invention is not limited in any way by these examples.

Preparation of Coating Liquid for Forming Intermediate Layer

A silica alkoxide (a hydrolysis liquid of an alkoxysilane, produced by Colcoat. Co., Ltd.), and a titanium alkoxide (titanium diisopropoxy bis(acetylacetonate), NDH-510C, produced by Nippon Soda Co., Ltd.) or a zirconium alkoxide (compound name: zirconium tributoxy monoacetylacetonate, product name: ORGATIX ZC-540, produced by Matsumoto Fine Chemical Co., Ltd.) were mixed so that a weight ratio of the solid contents after firing became the ratio described in the following Tables. Subsequently, the mixture was diluted with a mixed solvent of 2-propanol (80%) and methyl cellosolve (20%) so that a solid content after firing became 0.5%, and the diluted liquid was mixed by a stirrer. The mixed liquid obtained was allowed to stand for 1 hour or more, and this was used as a coating liquid for forming an intermediate layer.

Preparation of Coating Liquid for Forming Photocatalyst Layer

A titanium alkoxide (compound name: titanium diisopropoxy bis(acetylacetonate), product name: NDH-510C, produced by Nippon Soda Co., Ltd.) and a zirconium alkoxide (compound name: zirconium tributoxy monoacetylacetonate, product name: ORGATIX ZC-540, produced by Matsumoto Fine Chemical Co., Ltd.) were mixed so that a weight ratio of the solid contents of titanium oxide/zirconium oxide after firing became the ratio described in the following Tables. Subsequently, the mixture was diluted with a mixed solvent of 2-propanol (80%) and methyl cellosolve (20%) so that a solid content after firing became 0.5%, and the diluted liquid was mixed by a stirrer. The mixed liquid obtained was allowed to stand for 1 hour or more, and this was used as a coating liquid.

Preparation of Ceramic Tile

Ceramic raw materials were cast molded to obtain a body, and on a surface of this body, a glaze was coated by using a hand spray gun (F100, manufactured by Meiji Air Compressor MFG. Co., Ltd.). Subsequently, the coated body was, while being heated and cooled gradually, calcined by being passed through a tunnel kiln set at a maximum temperature of 1180° C. over a 24-hour period to obtain a ceramic tile. In addition, as the glaze, there was used one having a composition in the following range:

$SiO_2$: 55 to 80 wt %
$Al_2O_3$: 5 to 13 wt %
$Fe_2O_3$: 0.1 to 0.4 wt %
MgO: 0.8 to 3 wt %
CaO: 8 to 17 wt %
ZnO: 3 to 8 wt %
$K_2O$: 1 to 4 wt %
$Na_2O$: 0.5 to 2.5 wt %
ZrO: 0.1 to 15 wt %
Pigment: 0.01 to 5 wt %

Formation of Intermediate Layer

The coating liquid for forming an intermediate layer obtained above was coated on a surface of the ceramic tile obtained above by using a hand spray gun (F100, manufactured by Meiji Air Compressor MFG. Co., Ltd.) while controlling the coating amount so that the film thickness after firing became 50 nm.

Formation and Firing of Photocatalyst Layer

The coating liquid for forming a photocatalyst layer obtained above was coated on a surface of the ceramic tile obtained above, on which the coating liquid for forming an intermediate layer had been coated, by using a hand spray gun (F100, manufactured by Meiji Air Compressor MFG. Co., Ltd.) while controlling the coating amount so that the film thickness after firing became 50 nm.

Subsequently, the coated ceramic tile was, while being heated and cooled gradually, calcined by a high-temperature electric furnace (FUH732DA, manufactured by Advantec Co., Ltd.) set at a maximum temperature of 800° C. over a 24-hour period to obtain a photocatalyst coated tile.

Photocatalytic Activity

Photocatalytic activity of the photocatalyst coated tile was evaluated in terms of a methylene blue decomposition index in accordance with JIS R1703-2. The result was evaluated based on the following criteria:

Decomposition index is 7 or more: Good
Decomposition index is 5 or more and less than 7: Fair
Decomposition index is less than 5: Poor
The results are as shown in the following Tables.

Acidity and Alkalinity Resistance Test

There was prepared a test device which discharges acidic water (pH 3.5) and alkaline water (pH 9.5) each for 10 seconds alternately at 2-minute intervals, and below the flowing water of the device, there was placed the photocatalyst coated tile. Hereat, application of both acidic water and alkaline water was defined as 1 cycle.

After a prescribed number of cycles elapsed, a tape peel test was performed based on JIS K5600-5-6. The result was evaluated based on the following criteria:

No peeling at 14000 cycles: Excellent

Peeling at from more than 10000 cycles to 14000 cycles: Good

Peeling at from more than 6000 cycles to 10000 cycles: Fair

Peeling at 6000 or less cycles: Poor

The results are as shown in the following Tables.

Sliding Resistance Test

A sliding resistance test of the photocatalyst coated tile was performed by using a rubbing tester (manufactured by Taihei Rika Co., Ltd.). A urethane sponge (Scotch-Brite (SS-72K, produced by Sumitomo 3M Ltd.)) was cut into a 2.24 cm square piece, which was adhered to a head of the tester by using a double-sided adhesive tape so that the non-woven cloth portion touches the sliding surface and thereafter was moistened with water. Subsequently, a weight of 250 g (loading condition: 5 kPa) was placed on the head, which was slid against the tile a prescribed number of times, and presence or absence of scratches on the tile surface was visually confirmed. The urethane sponge was replaced with a new one every 1000 times of sliding. The result was evaluated according to the following criteria:

No scratch visually recognized after 20000 times of sliding: Excellent

Scratches visually recognized after from more than 10000 times to 20000 times of sliding: Good Scratches visually recognized after from more than 2000 times to 10000 times of sliding: Fair Scratches visually recognized after 2000 or less times of sliding: Poor.

The results were as shown in the following Tables.

In addition, the numerical values in the Tables represent mass % or values based thereon.

TABLE 1

| | Photocatalyst layer $TiO_2/ZrO_2$ | Intermediate layer $SiO_2/TiO_2$ | Photocatalyst activity | Acid/base durability test | Sliding resistance test |
|---|---|---|---|---|---|
| Example A1 | 90/10 | 95/05 | Good | Excellent | Excellent |
| Example A2 | 90/10 | 90/10 | Good | Excellent | Excellent |
| Example A3 | 80/20 | 98/2 | Good | Excellent | Excellent |
| Example A4 | 80/20 | 95/5 | Good | Excellent | Excellent |
| Example A5 | 80/20 | 90/10 | Good | Excellent | Excellent |
| Example A6 | 95/5 | 98/2 | Good | Good | Good |
| Example A7 | 95/5 | 85/15 | Good | Good | Good |
| Example A8 | 75/25 | 98/2 | Good | Excellent | Excellent |
| Example A9 | 75/25 | 85/15 | Good | Good | Excellent |

TABLE 2

| | Photocatalyst layer TiO2/ZrO2 | Intermediate layer SiO2/TiO2 | Photocatalyst activity | Acid/base durability test | Sliding resistance test |
|---|---|---|---|---|---|
| Comparative Example A1 | 100/0 | 100/0 | Good | Poor | Poor |
| Comparative Example A2 | 100/0 | 95/5 | Poor | Good | Excellent |
| Comparative Example A3 | 100/0 | 90/10 | Good | — | Poor |
| Comparative Example A4 | 100/0 | 80/20 | Good | Poor | Poor |
| Comparative Example A5 | 95/5 | 100/0 | Good | Good | Poor |
| Comparative Example A6 | 90/10 | 100/0 | Good | Poor | Fair |
| Comparative Example A7 | 80/20 | 100/0 | Fair | Poor | Excellent |
| Comparative Example A8 | 80/20 | 80/20 | Good | Excellent | Poor |
| Comparative Example A9 | 80/20 | (None) | Good | Poor | Good |
| Comparative Example A10 | 70/30 | 95/5 | Poor | Excellent | Excellent |
| Comparative Example A11 | 75/25 | 100/0 | Good | Poor | Good |
| Comparative Example A12 | 100/0 | 98/2 | Poor | Fair | Good |
| Comparative Example A13 | 70/30 | 98/2 | Poor | Excellent | Excellent |
| Comparative Example A14 | 100/0 | 85/15 | Good | Fair | Poor |
| Comparative Example A15 | 70/30 | 85/15 | Poor | Good | Excellent |
| Comparative Example A16 | 95/5 | 80/20 | Good | Poor | Poor |
| Comparative Example A17 | 75/25 | 80/20 | Fair | Excellent | Poor |

TABLE 3

| | Photocatalyst layer TiO2/ZrO2 | Intermediate layer SiO2/ZrO2 | Photocatalyst activity | Acid/base durability test | Sliding resistance test |
|---|---|---|---|---|---|
| Example B1 | 90/10 | 95/5 | Good | Excellent | Excellent |
| Example B2 | 90/10 | 90/10 | Good | Excellent | Excellent |
| Example B3 | 80/20 | 95/5 | Good | Excellent | Excellent |
| Example B4 | 80/20 | 90/10 | Good | Excellent | Excellent |
| Example B5 | 95/5 | 98/2 | Good | Fair | Good |
| Example B6 | 75/25 | 98/2 | Good | Fair | Good |
| Example B7 | 95/5 | 85/15 | Good | Good | Good |
| Example B8 | 75/25 | 85/15 | Good | Fair | Fair |

TABLE 4

| | Photocatalyst layer TiO2/ZrO2 | Intermediate layer SiO2/ZrO2 | Photocatalyst activity | Acid/base durability test | Sliding resistance test |
|---|---|---|---|---|---|
| Comparative Example B1 | 100/0 | 100/0 | Good | Poor | Poor |
| Comparative Example B2 | 95/5 | 100/0 | Good | Good | Poor |
| Comparative Example B3 | 90/10 | 100/0 | Good | Poor | Fair |
| Comparative Example B4 | 80/20 | 100/0 | Fair | Poor | Excellent |
| Comparative Example B5 | 75/25 | 100/0 | Good | Poor | Good |
| Comparative Example B6 | 100/0 | 98/2 | Good | Poor | Poor |
| Comparative Example B7 | 70/30 | 98/2 | Poor | Fair | Excellent |
| Comparative Example B8 | 100/0 | 85/15 | Good | Poor | Poor |
| Comparative Example B9 | 70/30 | 85/15 | Poor | Good | Excellent |
| Comparative Example B10 | 95/5 | 80/20 | Good | Fair | Poor |
| Comparative Example B11 | 75/25 | 80/20 | Good | Poor | Poor |

TABLE 5

| | Photocatalyst layer TiO2/ZrO2 | Intermediate layer SiO2/Al2O3 | Photocatalyst activity | Acid/base durability test | Sliding resistance test |
|---|---|---|---|---|---|
| Comparative Example C1 | 80/20 | 95/5 | Good | Poor | Excellent |

What is claimed is:

1. A sanitary ware comprising a substrate, a glaze layer comprising natural mineral particles provided on the surface thereof, an intermediate layer provided on the glaze layer, and a photocatalyst layer provided on the intermediate layer,
    wherein the photocatalyst layer comprises titanium oxide and zirconium oxide wherein the amount of titanium oxide is 95 mass % to 75 mass % and the amount of zirconium oxide is 5 mass % to 25 mass % and
    the intermediate layer comprises silica and titanium oxide and/or zirconium oxide wherein the amount of silica is 98 mass % to 85 mass %, and the amount of titanium oxide or zirconium oxide is 2 mass % to 15 mass % when the intermediate layer comprises either of titanium oxide or zirconium oxide or the total amount of titanium oxide and zirconium oxide is 2 mass % to 15 mass % when the intermediate layer comprises both titanium oxide and zirconium oxide.

2. The sanitary ware according to claim 1, wherein the intermediate layer comprises silica and titanium oxide, wherein the content of the silica is 90 to 98 mass %, and the content of the titanium oxide is 2 to 10 mass %.

3. The sanitary ware according to claim 2, wherein the content of the silica is 90 to 95 mass %, and the content of the titanium oxide is 5 to 10 mass %.

4. The sanitary ware according to claim 1, wherein the intermediate layer comprises silica and zirconium oxide, and the content of the silica is 90 to 98 mass %, and the content of the zirconium oxide is 2 to 10 mass %.

5. The sanitary ware according to claim 4, wherein the content of the silica is 90 to 95 mass %, and the content of the zirconium oxide is 5 to 10 mass %.

6. The sanitary ware according to claim 1, wherein, in the photocatalyst layer, the content of the titanium oxide is 90 to 80 mass %, and the content of the zirconium oxide is 10 mass % to 20 mass %.

7. The sanitary ware according to claim 1, wherein the intermediate layer has a thickness Of 50 to 150 nm.

8. The sanitary ware according to claim 1, wherein the photocatalyst layer has a thickness of 50 to 150 nm.

9. A method for producing the sanitary ware according to claim 1, comprising the steps of:
   coating a coating liquid on the glaze layer of the sanitary ware, the coating liquid being obtained by
   mixing a silicon alkoxide or a hydrolysis product thereof, and a titanium alkoxide and/or a zirconium alkoxide;
   further coating a coating liquid containing the precursor of titanium oxide and the precursor of zirconium oxide; and
   firing the coating liquids at a temperature of 750 to 850° C.

\* \* \* \* \*